United States Patent [19]

Bushaw et al.

[11] Patent Number: 4,476,522

[45] Date of Patent: Oct. 9, 1984

[54] PROGRAMMABLE PERIPHERAL PROCESSING CONTROLLER WITH MODE-SELECTABLE ADDRESS REGISTER SEQUENCING

[75] Inventors: Kenneth A. Bushaw, Longmont, Colo.; Darwin P. Rackley, Boca Raton, Fla.; Milton H. Woodward, Boulder, Colo.

[73] Assignee: International Business Machines Corporation, Armonk, N.Y.

[21] Appl. No.: 241,902

[22] Filed: Mar. 9, 1981

[51] Int. Cl.[3] .................... G06F 3/00; G06F 9/22; G06F 15/16
[52] U.S. Cl. ................................................ 364/200
[58] Field of Search ... 364/200 MS File, 900 MS File

[56] References Cited

U.S. PATENT DOCUMENTS

| | | | |
|---|---|---|---|
| 3,465,298 | 9/1969 | Duke et al. | 364/200 |
| 3,558,811 | 1/1971 | Montevecchio et al. | 178/6 |
| 3,560,937 | 2/1971 | Fischer | 340/172.5 |
| 3,740,728 | 6/1973 | Pullen | 364/200 |
| 3,751,582 | 8/1973 | Wernikoff et al. | 178/6 |
| 3,902,162 | 8/1975 | Parkinson et al. | 364/200 |
| 3,909,799 | 9/1975 | Recks et al. | 340/172.5 |
| 3,914,537 | 10/1975 | Perreault et al. | 178/6 |
| 4,067,059 | 1/1978 | Derchak | 364/200 |
| 4,079,452 | 3/1978 | Larson et al. | 364/900 |
| 4,156,798 | 5/1979 | Doelz | 179/15 |
| 4,188,668 | 2/1980 | Finlay | 364/900 |
| 4,261,033 | 4/1981 | Lemay et al. | 364/200 |
| 4,394,734 | 7/1983 | Norgren et al. | 364/200 |

Primary Examiner—James D. Thomas
Assistant Examiner—Archie E. Williams, Jr.
Attorney, Agent, or Firm—Homer L. Knearl

[57] ABSTRACT

A peripheral processing controller controls time-shared access to a memory by specialized peripheral devices. The specialized peripheral devices process data independently of a central processor that simply supervises the system. The peripheral processing controller uses predetermined modes of memory space allocation for the various peripheral devices. A memory address register in the controller is assigned to each peripheral device. In addition, each MAR has one or more predefined modes of memory space allocation and, when active, controls memory access for its assigned peripheral device. The modes also define the size of the block of space allocated and whether memory access scrolls through various blocks of space or jumps between blocks of space. The controller also detects when a peripheral device has consumed all the space in a block. Further, for those MAR's having more than one mode of space allocation, the controller selects the mode appropriate for the peripheral device requesting access to the memory.

9 Claims, 9 Drawing Figures

PROGRAMMABLE PERIPHERAL PROCESSING CONTROLLER WITH MODE-SELECTABLE ADDRESS REGISTER SEQUENCING

DESCRIPTION

1. Field of the Invention

This invention relates to data processing systems where large quantities of data from peripheral devices must be processed. In particular it relates to specialized peripheral devices processing data with a memory shared by the peripheral devices. Depending upon the data processing function desired the access to the memory requires different storage map patterns in the memory. One technical area where the invention has particular applicability is processing video data in a document distribution system.

2. Background Art

In document distribution systems, the document to be transmitted is converted to millions of data bits per page. Document Distribution systems may use coded information (CI) or non-coded information (NCI) to electronicly transmit the document image. Whether the data is CI or NCI, it must be processed before it is transmitted. Processing may include data compression to reduce transmission time and data encryption for security purposes. Processing millions of data bits with a single processor to achieve these functions is wasteful and time-consumming.

It is much more efficient to use specialized peripheral devices working in parallel to perform the scan, compress, encrypt, transmit, receive, decrypt, decompress and print operations. An example of such a system is described in copending commonly-assigned patent application, Ser. No. 220,637, filed Dec. 29, 1980, entitled Shared Peripheral Processing System by K. A. Bushaw et al.

The apparatus shown in the Bushaw et al application uses a peripheral processing controller to control the access of the peripheral devices to the memory they share. Further there are two embodiments of the inventive system in the Bushaw et al application and each embodiment uses a different peripheral processing controller. One of these controllers is the subject of the present invention. The other controller is the subject of copending commonly-assigned now U.S. Pat. No. 4,394,734, entitled Progammable Peripheral Processing Controller.

SUMMARY OF THE INVENTION

It is the object of this invention to control the memory space accessed by peripheral devices so that, as they process data directly with the memory, the devices operate in an efficient manner with predefined memory space allocations.

In accordance with this invention the above object is accomplished by assigning each peripheral device to a MAR and using predetermined modes of memory access for each device and thus with each MAR. Further, MAR's in the peripheral processing controller automatically reset to a predefined starting address in a region of memory at the end of processing each block of space in memory. The size of the block is predefined for the different modes of memory access. Also jumping between blocks is predefined for the different modes of memory access.

The advantage of this invention is that once the peripheral devices have their mode, MAR and region of memory defined the peripheral devices may proceed to process data directly with the peripheral memory under control of the peripheral processing controller with little or no supervision by the central processing unit.

DETAILED DESCRIPTION

Figure 1:
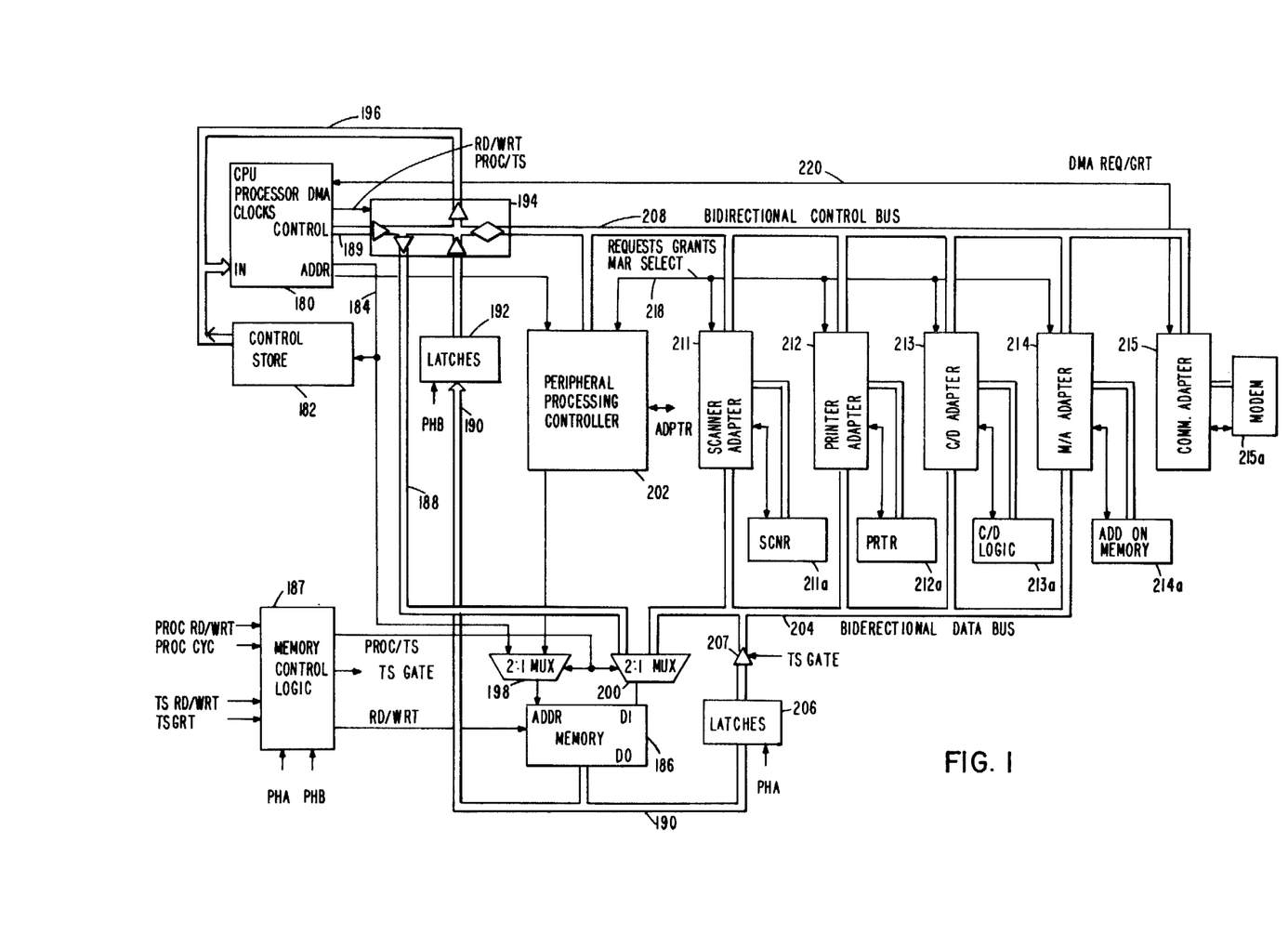
FIG. 1 shows a shared peripheral processing system where data processing is entirely accomplished by peripheral devices working with a memory under control of a peripheral processing controller.

Referring now to FIG. 1, the peripheral devices 211–215 process data directly with memory 186. In addition, the memory has a fixed amount of space allocated as work area memory for CPU 180. The peripheral processing controller 202 accesses fixed size memory blocks. The controller is initialized by the CPU to select different regions of memory in which the fixed size blocks are located.

The single lines indicated in FIG. 1 represent control lines interconnecting the functional blocks of the system. For example, control line 218 represents requests (for access), grants and MAR (Memory Address Register) select signals that pass between the peripheral processing controller 202 and the adapters 211 through 214. The request/grant lines 220 from the communications adapter 215 go to the CPU 180. This is because access to the memory by the communications adapter is controlled by CPU 180. Although data flow to the communication adapter 215 is supervised by CPU 180, the CPU is not processing any video data used by the communication adapter. The CPU is simply controlling the flow of data between the communication adapter and the memory 186.

Memory 186 is accessed in alternate cycles by CPU 180 and by the peripheral processing controller 202. Memory control logic 187 performs this function. One of the memory cycles is gated by phase A clock time and the other is gated by phase B clock time. This is accomplished by using a latch that is set by PHA and reset by PHB. The output of the latch switches MUX's 198 and 200 as described hereinafter.

Memory control logic 187 also responds to Proc RD/WRT, Proc Cycle, TS RD/WRT and TS GRT. The Proc signals are from the CPU and indicate whether a read or write operation is required during a processor cycle. The TS signals are from controller 202 and indicate an adapter has been granted access to memory 186 and whether a read or write operation is desired. Control logic 187 decodes these signals to generate the TS Gate signal and the RD/WRT signal. The TS Gate signal is used to enable driver 207 to pass information to the adapters 211 to 214. The RD/WRT signal tells the memory whether a read or write operation is being performed.

In operation, CPU 180 can address control store 182 for program instructions. Control store 182 would typically be a read only store. The address information from CPU 180 goes out over lines 184 to the control store 182. The control store 182 then reads back into the IN port of CPU 180 the control program stored in control store 182.

Memory 186 is preferably an 8K memory. A ½K portion of this memory is allocated to CPU 180. CPU 180 addresses its ½K portion of memory 186 via address lines 184. CPU 180 sends information to be stored in memory 186 over bus 189, through bus steering 194 and over bus 188. If the CPU is reading information from memory 186, it receives the information over bus 190 through latches 192, bus steering 194 and over input bus 196.

Memory 186 is accessed in alternate memory cycles either by the CPU 180 or by the peripheral devices. In one cycle, MUX 198 and MUX 200 are switched to pass addresses from the CPU to the memory 186 and data from the CPU to the memory 186. In the next cycle, MUX 198 and MUX 200 are switched to receive address information from MARs inside the peripheral processing controller 202 and data from the peripheral devices over data bus 204. Thus every other cycle of the memory is given to the CPU 180 to control. The other cycle is time-shared by all of the peripheral devices.

The output bus 190 from memory 186 goes to both latches 192 and latches 206. Latches 192 are loaded at PHB clock time while latches 206 are loaded at PHA clock time.

Bus steering 194 is provided to steer control information from the latches 192 or from the CPU 180 either to the bidirectional control bus 208 or to the input bus 196 of the CPU. When the CPU is reading its allocated space in memory 186, bus steering 194 steers the information from latches 192 to input bus 196 for the CPU. When the CPU is acting to give the communications adapter direct memory access during a CPU cycle of the memory, the bus steering steers the data received from latches 192 out on the bidirectional control bus 208 to the communications adapter 215. In this instance, the control bus 208 is carrying video information instead of control information. Similarly, when the communication adapter is sending video information received from modem 215a, the adapter sends the video information to the memory 186 via bus 208, bus steering 194 and bus 188.

If CPU 180 is reading control information from the adapters 211 through 215, bus steering is gated such that the control information coming over bidirectional control bus 208 is passed to input bus 196 for the CPU. If the CPU is writing control information to the controller 202 or the adapters 211 through 215, bus steering 194 passes the control information from output bus 189 of the CPU to bidirectional control bus 208. Thus the bus steering 194 consists of gated drive circuits driven by read/write signals or PROC/TS cycle allocations signals from CPU 180.

Each of the adapters 211 through 214 operate in substantially the same manner. Each of the adapters 211 through 214 adapts the control bus and the data bus to interface with the hardware function performed by the peripheral device connected to the adapter. The scanner adapter 211, the printer adapter 212, the compression/decompression adapter 213 and the minimum attendance adapter 214 adapt these buses to connect them to scanner 211A, printer 212A, compression/decompression logic 213A and add-on-memory 214A. The minimum attendance function provides additional storage space to store video data. Add-on-memory 214A, tape storage or disk storage might be used.

The communications adapter 215 connects the modem 215A to the control bus 208. As previously described, transmitted video data, instead of being passed over the data bus 204 to the communications adapter 215, is passed over the control bus 208 to the communications adapter 215. It is common to use a communication adapter attached to a single bus. Therefore, for this one adapter it may be more attractive to use an established communication adapter with a single bus for both data communications and control communications.

When a DMA (Direct Memory Access) cycle is granted by the CPU during the reading of information between communication adapter 215 and memory 186, the data flow is over control bus 208, through bus steering 194 and over input memory bus 188. A DMA cycle occurs during a processor (PROC) access cycle to memory 186 rather than during a time share (TS) access cycle. CPU 180 simply allocates its cycle for use by the communications adapter 215.

Figure 2:
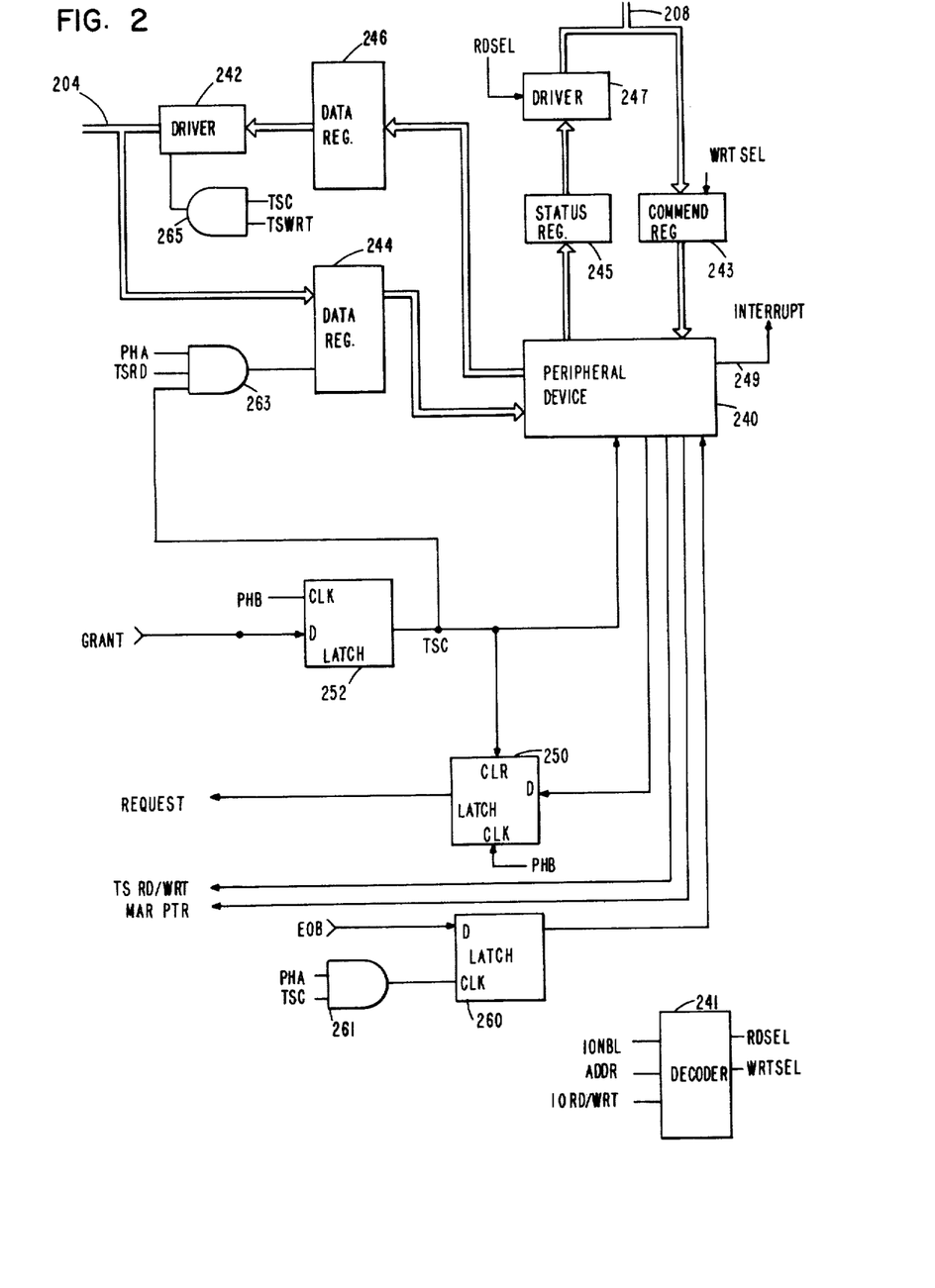
FIG. 2 shows the adapters used in FIG. 1.

The function of each of the adapters 211-214 is similar. FIG. 2 is an example of an adapter that may be used for any of the adapters 211 through 214.

The control information passing over bidirectional bus 208, goes to command register 243 or comes from status register 245 through driver 247. The peripheral device 240 responds to the commands in register 243 to perform the scanning, printing, compression or decompression or memory storage function depending upon the peripheral device represented. The commands that enable the driver 247 or the command register 243 are decoded by decoder 241. Decoder 241 receives the I/O enable (IONBL), the address of the register 243 or 245 and the I/O read/write signal, all from CPU 180.

When the CPU wishes to send control information to peripheral device 240, it sends an I/O read write signal (IO RD/WRT) and the address of the adapter's command register 243 to the adapter. Decoder 241 in the adapter responds to the address and the IO RD/WRT signal and generates the write select (WRT SEL) signal. This signal enables command register 243 to receive and store the control information over bus 208.

When CPU 180 wishes to check the status of the peripheral device 240, it addresses status register 245. The CPU sends decoder 241 an IONBL signal, an IO RD/WRT signal and the address of the status register 245 at the adapter. Decoder 241 generates the read select RDSEL signal to gate driver 247 to pass the information in status register 245 to CPU 180 over bus 208.

Data into or out of the peripheral device 240 goes through data registers 244 or 246. Incoming data is stored in data register 244 at PHA clock pulse time when there is a time shared cycle (TSC) signal and a time shared read (TSRD) signal present at AND 263. Data from the peripheral processing apparatus is buffered in register 246 before being driven out by driver 242. Driver 242 is enabled by AND 265 when there is a time shared cycle (TSC) and a time shared write (TSWRT) signal present.

The TSC signal is generated in response to the request-grant sequence. The request signal is triggered by the peripheral device 240 applying a signal at the data input terminal D of latch 250. At PHB clock time, latch 250 sets and generates the request signal. The request signal goes to controller 202 (FIG. 1). If the request is granted by the controller, the grant signal comes back to the data input terminal D of latch 252. At PHB clock time if the grant signal comes up, latch 252 is set, and the time shared cycle (TSC) signal is generated. At the next phase B clock time, latch 252 resets and the TSC signal ends. The TSC signal is also used to clear the request latch 250. Also, the TSC signal is passed back to peripheral device 240 to indicate that a time shared cycle has been granted.

At the same time that the peripheral device 240 generated the request signal to latch 250, it also generated the time shared read/write (TS RD/WRT) signal and the MAR pointer signal. These signals are passed to the controller 202 at the same time as the request.

When the controller 202 (FIG. 1) detects that an end of block (EOB) condition exists, the EOB signal is sent by the controller back to the adapter to the data input terminal of latch 260. If the EOB signal is present at latch 260, and AND gate 261 is enabled, latch 260 sets. AND 261 is enabled at phase A clock time if it is a time share cycle as indicated by latch 252. When latch 260 sets, it signals the peripheral device 240 that an EOB condition has been detected at the controller. The processing apparatus 240 then sends an interrupt signal back to CPU 180 over line 249.

Figure 3:
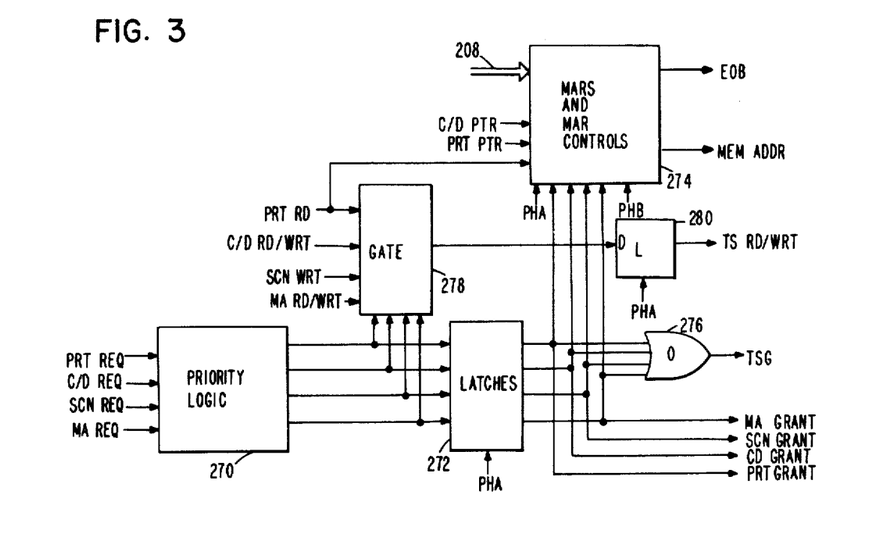
FIG. 3 shows the peripheral processing controller used in FIG. 1.

Referring now to FIG. 3, the peripheral processing controller 202 of FIG. 1 is shown. The memory address registers, MARS, and memory address register controls used in the controller of FIG. 3 are shown in detail in FIG. 4. The request signals from the adapters are processed by priority logic 270. The priority ranking from high to low is printer, compressor/decompressor, scanner and minimum attendance. Priority logic 270 will have a signal on one of its four output lines indicating the request representing the highest priority. The signal on one of the lines from the logic 270 sets one of the latches 272 at PHA clock time. Grant latches 272 indicate which adapter has been granted access. Each of the grant lines is passed to the MAR controls 274 and to OR 276. OR 276 indicates a time share grant (TSG) has been generated.

The output from the priority logic 270 also enables gate 278 which passes a read/write signal to latch 280. Latch 280 is set by the phase A clock signal and indicates whether a time share read condition or a time share write condition exists. The TSRD or TSWRT signal goes to memory control logic 187 (FIG. 1) to control memory read or write. Since the printer is only going to read data, it only has a print read signal as input to gate 278. Similarly, since the scanner is only going to write data into memory, it only has a scan write signal into gate 278.

MAR controls 274 in addition to receiving the grant signals, also receive pointer signals. A compress/decompress, two-bit pointer (C/D PTR) and a printer pointer (PRT PTR) signal are received from adapters 213 and 212, respectively. In addition, the print read (PRT RD) signal is passed to the MAR controls also as a pointer. These signals point to MARS which are to be selected by the MAR controls. The MARs and MAR controls also receive control information over the control bus 208. The MAR controls generate the memory address signal which is passed to MUX 198 (FIG. 1) to address the byte in memory 186 which is desired. The MAR controls also generate the end of block (EOB) signal which is passed back to the adapters.

Figure 4:
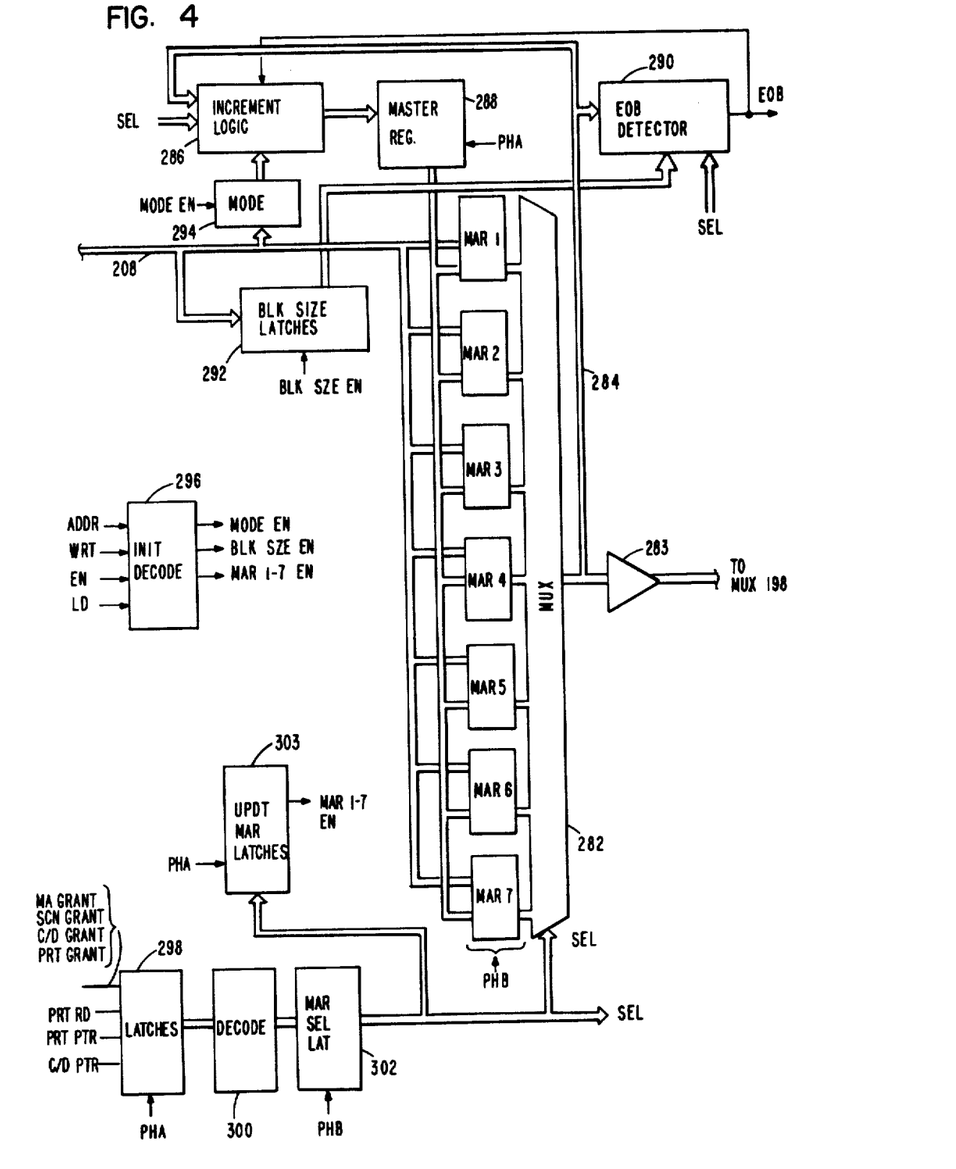
FIG. 4 shows the MAR's and MAR controls 274 used in FIG. 3.

The MARS and MAR control are shown in detail in FIG. 4. A selected MAR is used to address a section of memory until a block of data has been processed by a peripheral device through its adapter. The MAR leads the device through a block of memory by having the address of the memory updated in the MAR during each memory access cycle. Accordingly, as the contents of the MAR are read out through MUX 282 to address the memory 186, they are also fed back over bus 284 to increment logic 286. In the increment logic, the address is incremented by one and stored in the master register 288. The updated address for the selected MAR is then loaded back into its MAR at phase B clock time.

The increment logic 286 not only increments the low order count representative of the address, but can also be used to increment the region portion of the address. Thus, the increment logic 286 not only advances memory access through a block of memory, it also may be used to jump memory access between blocks of memory and start new blocks of memory for access. The operation of the increment logic will be described hereinafter with reference to FIG. 6.

The memory addresses from the MARS are also passed to the end of block detector 290. The EOB detector may be set to predetermined block sizes. Then, depending upon the block size and certain MAR select signals, detector 290 will look for specific address counts to indicate an end of block condition. The EOB condition goes back to the adapter and is also used by the increment logic as will be discussed hereinafter.

The size of the block detected by the end of block detector 290, is specified by the block size loaded into latches 292 by computer 180 over bus 208. The computer 180 also sets up the mode register 294 over bus 208. The mode register indicates the mode of operation to the increment logic. By this means, the MARS and MAR controls are initialized to access different predetermined block sizes in memory and to move data between blocks.

All the initialization of the MARS and MAR controls in FIG. 4 is accomplished by CPU 180. The command lines, address (ADDR), write (WRT), enable (EN) and load (LD) all come from CPU 180 to initial decode 296. Initial decode then generates the mode enable (MODE EN) signal to load the mode information into mode register 294. Decode 296 also generates the block size enable (BLK SZE EN) signal to load the block size word from CPU 180 into latches 292. Decode 296 also generates a MAR 1-7 EN (enable) signal to load the initial addresses into MARS 1 through MAR 7. The initial addresses of these MARS in the low order eight bits is always 0. The higher order five bits may be controlled by CPU 180 to specify different regions of memory to which the MARS will grant access.

After initialization, the adapters select MARS through the latches 298. Latches 298 at phase A clock time store the grant signal and the pointer signal received from latches 272 in FIG. 3. These signals are decoded by decoder 300 to generate the MAR select (SEL) signal. The MAR select latches are set at phase B clock time. The output of the MAR select latches selects the MAR which is passed by MUX 282 to driver 283 for addressing the memory. The MAR select signal also is passed to the update MAR latches 303 and loaded therein at phase A clock time. The output of the update MAR latches is used to enable selected MAR 1-7 at PHB time to update its contents with the updated address from master register 288.

Thus the sequence of operations is as follows. A selected MAR, say MAR 5, passes its address out to the memory through driver 283. The address in MAR 5 is also fed back to increment logic 286. Increment logic 286 advances the address and applies it to master register 288. At phase A clock time, master register 288 loads the updated address. Also at phase A time, the update MAR latches 303 are set, and the selected MAR (MAR 5) is enabled to receive the updated address from master register 288 by the next PHB clock signal. All of the MAR's receive the PHB clock signal and the MAR enabled by latches 303 is updated. Thus, in one phase B to phase B cycle the address from MAR 5 has gone to the memory and the new updated address has been loaded back into MAR 5.

Figure 5:
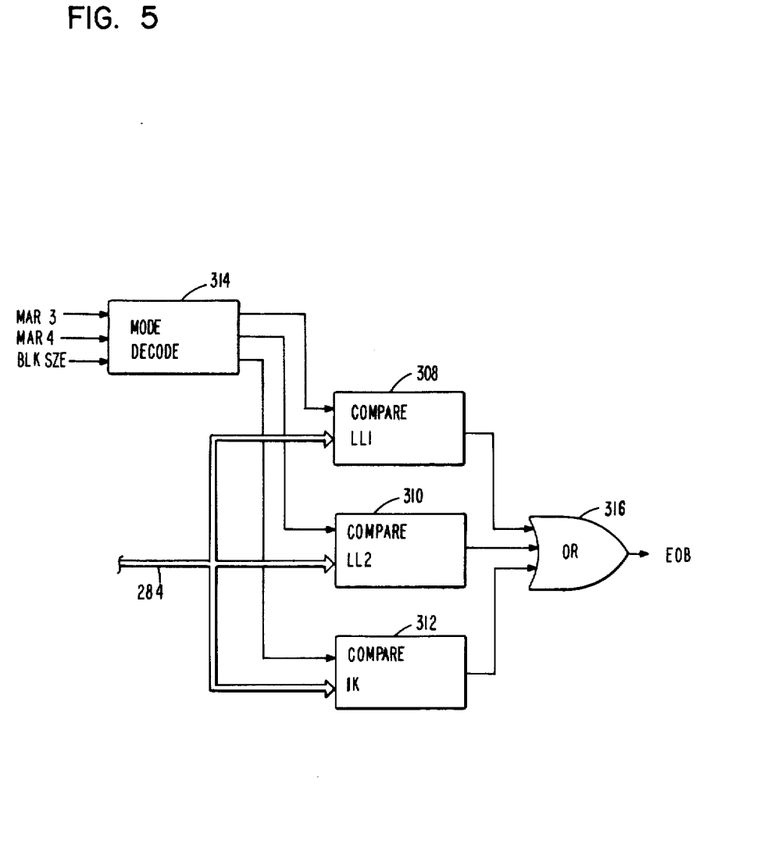
FIG. 5 shows the end-of-block detection apparatus used in MAR controls 274 of FIG. 3.
Figure 6:
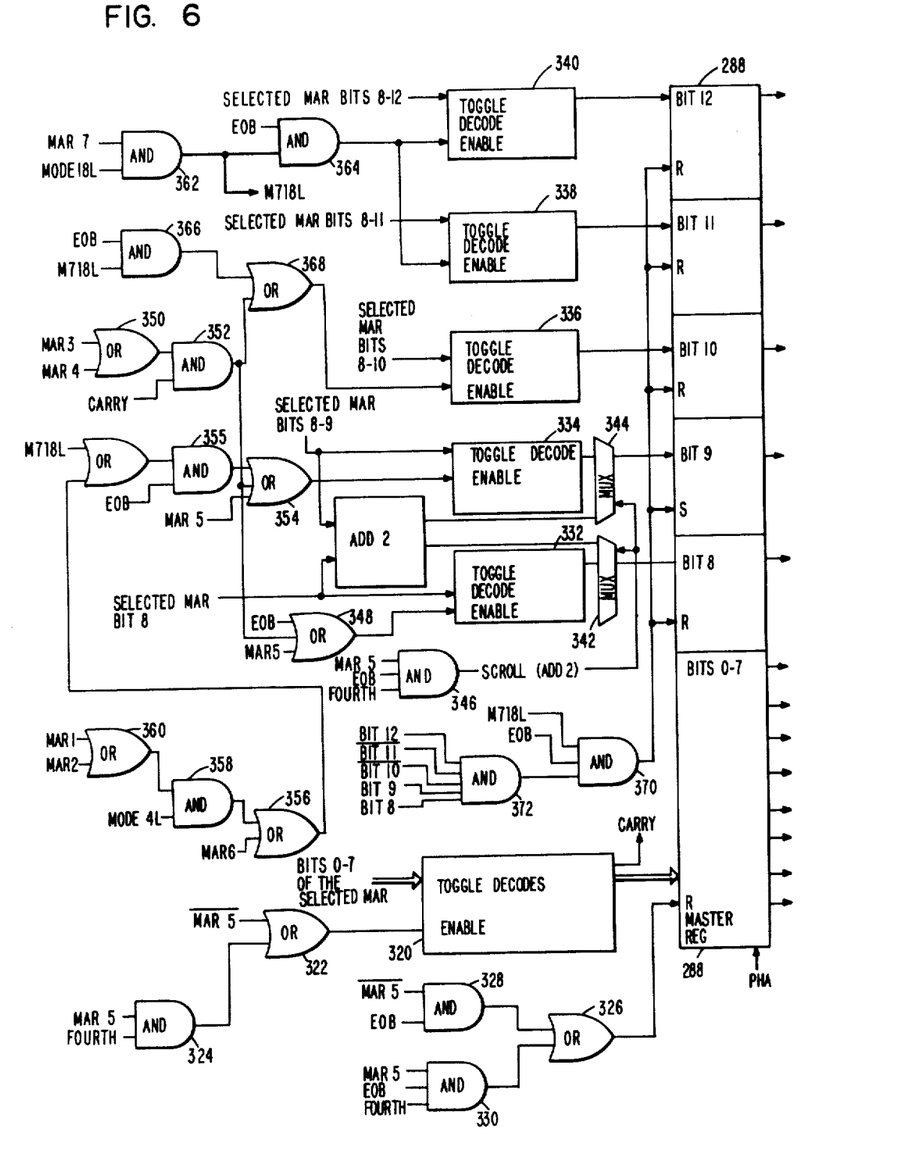
FIG. 6 shows the increment logic 286 and master register 288 used in FIG. 4.

The EOB detector 290 and the increment logic 286 of FIG. 4 are shown in detail in FIGS. 5 and 6, respectively. The end of block detection in FIG. 5 is performed by comparing the address from the selected MAR to predetermined values set in the comparators. Comparators 308 and 310 look for block sizes corresponding to two different line lengths, LL1 and LL2. These lengths correspond to the number of bytes required to store all the picture elements (PELs), black and white dots, in a line of the image. The two lengths might correspond to different resolution sizes but more typically correspond to different widths of images being processed. Comparator 312 has nothing to do with line lengths and is simply a compare on a 1K block size in the memory (1K equals 1,024 bytes).

The active comparator is selected by mode decode 314. Inputs to this decode are the MAR 3 or MAR 4 SEL signal plus the block size from latches 292 in FIG. 4. As will be discussed hereinafter MARS 3 and 4 use the 1K block size. The block size (BLK SZE) signal indicates the line length and is used to enable either compare 308 or compare 310. Whichever compare is enabled, OR 316 collects their outputs to generate the EOB signal.

To understand the increment logic in FIG. 6, it is first necessary to understand the modes of addressing the memory and the effect of these modes, on memory space. Maps of memory space in various modes of operation are shown in FIGS. 7A and 7B.

There are five modes or sequences of utilization of the memory space. Some of these modes are selectable by loading mode bits into mode latches 294 (FIG. 4). Other modes are simply preassigned to a given MAR and are triggered by the MAR select signal from latches 302 (FIG. 4). The five modes are 2L, 4L, 18L, 2K and 4S.

Mode 2L indicates that two lines of image data are being processed. An example of the mode 2L use of memory space is shown in FIG. 7A. The address for a location in memory is specified by 13 bits read from one of the MARs. The low order eight bits are always set to zero at the beginning of a block. To address different regions of the memory for a block, the highest order five bits are changed. In mode 2L, the lowest order eight bits are incremented by one until processing works its way through one line of the image data and an end of block condition is detected. Upon detecting end of block, bits 0-7 are reset to zero and bit 8 is toggled to its opposite state.

Figure 7A:
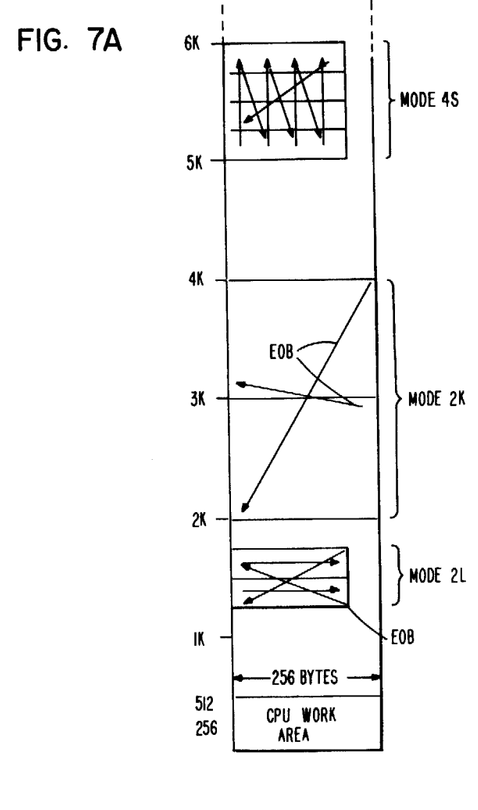
FIGS. 7A and 7B are example maps of memory space use as controlled by the peripheral processing controller.
Figure 7B:
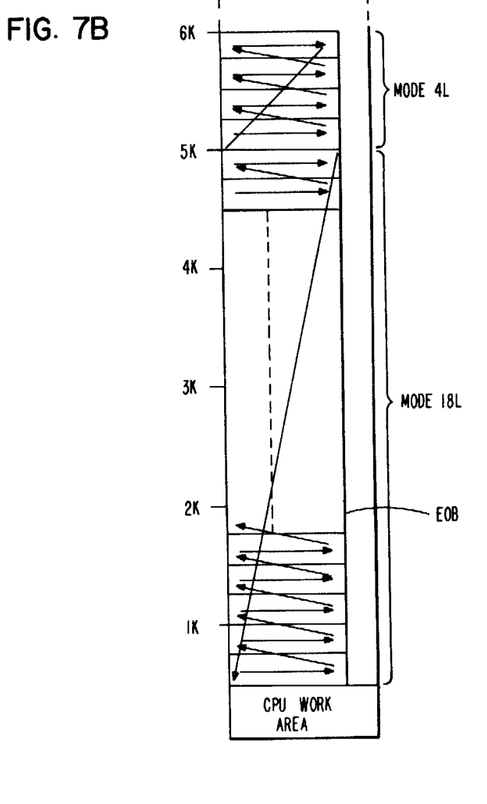

As depicted for mode 2L in FIG. 7A, a line will be processed until an end of block condition is detected and then memory access ping-pongs between two lines. Note that as represented, each line has a capacity of 256 bytes, however, the line length LL1 or LL2, whichever is selected, is less than 256 bytes and thus the end of block condition occurs before end of a 256 byte section in memory.

The mode 2K use of memory space is substantially the same as the mode 2L use except the block size is much bigger. In mode 2L the block size is one line length of image data; in mode 2K the block size is 1K (1,024 bytes). A mode 2K utilization is depicted between the 2K and 4K address positions in FIG. 7A. Data is processed through a full 1K section of memory. At the end of the 1K section, an end of block condition is detected and the start address jumps to the beginning of the next 1K section. In other words, the 1K sections are used in ping-pong fashion just as the 2L mode uses two lines in ping-pong fashion. In mode 2K bits 0-9 are used and incremented and the start of a new section or the ping-ponging between sections is accomplished by toggling bit 10.

Mode 4L usage of the memory is depicted in FIG. 7B. In mode 4L, four lines of memory are processed serially, and then the address flies back from the last position on the fourth line to the first position of the first line. Mode 18L is also indicated in FIG. 7B. It is similar in operation to mode 4L except that 18 lines of image data are stored. In mode 4L the memory is addressed to each line by using bits eight and nine. In mode 18L, the memory works its way through the lines by utilizing all of the higher order five bits to sequentially address the lines.

Mode 4S is indicated in FIG. 7A. Mode 4S is utilized to scroll four lines of data. In other words, after four lines of data have been processed, the oldest line is overwritten with a new line of image qata. During image processing, all four lines are reviewed. This is indicated by the vertical arrows in the mode 4S memory map in FIG. 7A. The scrolling is represented by the fact that the flyback at the end of the block goes to the second line rather than the first line, reading from bottom to top in the map. This assumes that the bottommost line is the oldest line and is thus overwritten. Then when vertical processing of the data through the four lines begins again, the last line processed becomes the bottommost line rather than the topmost line. Manipulation of data in the memory in this way is useful in processing image data to enhance the image.

The sequencing of the addresses to access the memory, as depicted in the various modes shown in FIGS. 7A and 7B is accomplished by the increment logic, working with the master register, as shown in FIG. 6. Toggle decode circuits are used to increment the address bits from the selected MAR before they are loaded into the master register 288.

A toggle decode circuit is simply a count increment circuit that toggles its assigned bit if all bits lower than its assigned bit are binary one. Otherwise, it passes its assigned bit straight through. Basically, toggle decodes are used to build a counter that does not have ripple carries. Each bit of the increment logic looks at all the lower order bits and all bits are simultaneously changed. This means the count operation can be performed more rapidly than if the counter had to wait for carries to ripple through it.

In FIG. 6, the increment logic with the master register is broken into two separate counters. One counter implements bits 0–7 and is effectively an eight bit counter. The other counter is a five bit counter for MAR bits 8 through 12 and is selectable in the modes 2L, 4L, 18L, 2K and 4S.

The logic in FIG. 6 that enables the toggle decodes is dependent upon the MAR selected as indicated by latches 302 (FIG. 4) and the mode as indicated by mode latches 294 (FIG. 4). As discussed earlier, some MARS have preselected modes of operation while other MARS may be operated with the increment logic in selectable modes.

In the present embodiment, the MARS and modes are paired as follows. MARS 1 and 2 are assigned to the compression/decompression adapter and may be used in either mode 2L or mode 4L. MAR 3 is assigned to the compression/decompression adapter and operates in mode 2K. MAR 4 is assigned to the minimum attendance adapter and operates only in mode 2K. MAR 5 is assigned to the printer adapter and operates only in mode 4S. MAR 6 is assigned to the scanner adapter and operates only in mode 4L. MAR 7 is assigned to the scanner adapter or the communication adapter and operates selectively either in mode 2L or mode 18L.

Now looking at FIG. 6, toggle decodes 320 are enabled to increment bits 0 through 7 of the selected MAR. The enabling signal comes from OR 322 which will have an output whenever MAR 5 is not selected. If MAR 5 is selected, then OR 322 will have an output only if AND 324 indicates that a fourth line has been processed when MAR 5 is selected. This is due to the fact that MAR 5 operates only in mode 4S.

In mode 4S, bits 0–7 are incremented only every fourth byte access. This is because in mode 4S the image data is scanned vertically through four lines before the image data is processed (see mode 4S in FIG. 7A).

Bits 0–7 of the master register 288 are reset by OR 326. OR 326 collects outputs from ANDS 328 and 330. AND 328 has an output when MAR 5 has not been selected and an end of block condition is detected. This, in effect, is an end of line or end of block condition which causes the lower eight bits to be reset to zero. In mode 4S, the lower eight bits are not reset to zero until an end of block occurs at the end of a four byte vertical scan. Accordingly, AND 330 has an output when MAR 5 is selected and there is an EOB signal and a FOURTH signal.

Figure 8:
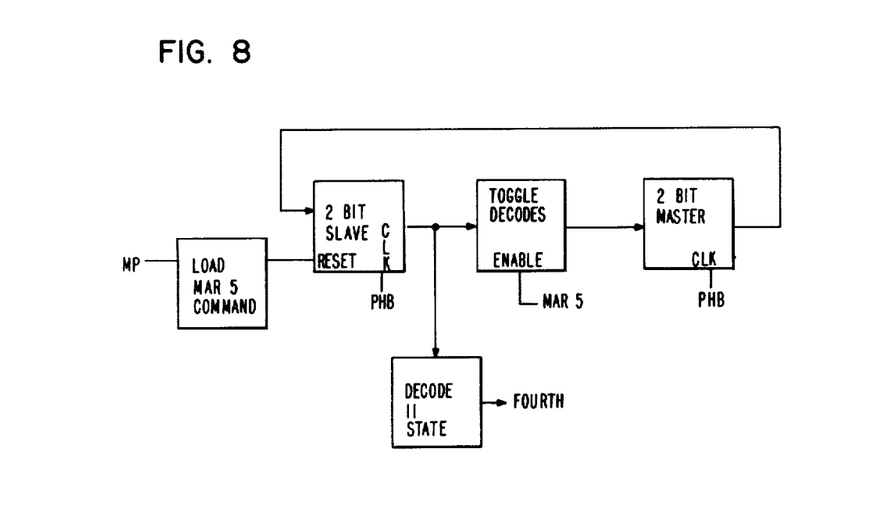
FIG. 8 shows a usage counter that generates the FOURTH access signal used in FIG. 6.

The FOURTH signal referred to is generated by the usage counter shown in FIG. 8 that counts four accesses to the memory. The counter is made up of a 2-bit master register, a 2-bit slave register and toggle decodes to increment the count from the slave to the master register. The counter is reset to zero when MAR 5 is initialized and is incremented by one each time MAR 5 is selected to access the memory. Every fourth access is decoded from the counter to generate the FOURTH signal used in FIG. 6.

As mentioned earlier, the high order five bits in MAR address are processed by the five bit counter operating on address bits 8–12 in FIG. 6. In the different modes, different portions of the five bit counter formed by bits 8 through 12 are used. In mode 2L, only toggle decode 332 and bit 8 are used to ping-pong between the two lines of data. In mode 2K only decode 336 and bit 10 are used to perform the ping-ponging between the two 1K blocks. Bits 8 and 9 are used in this mode in addition to bits 0 through 7 as part of the regular incrementing through the 1K block. In mode 4L or 4S, toggle decodes 332 and 334 are used with bits 8 and 9. In mode 18L, all five toggle decodes 332, 334, 336, 338 and 340 are used with all five bit positions 8 through 12 of the upper five bits in master register 288.

MUXs 342 and 344 are only used to select between MAR 5 operation (mode 4S) and all other operations. These MUXs are switched by AND 346. AND 346 generates a scroll output signal when there is a MAR 5 and an end of block condition and a FOURTH signal. This causes bits 8 and 9 to be incremented by 2 instead of being incremented by 1 before they are loaded into master bit positions 8 and 9. This is due to the scroll operation as depicted in mode 4S in FIG. 7A. At the end of the four line scan in mode 4S instead of returning to the first line, memory accessing returns to the second line.

As shown in FIG. 6, toggle decode 332 is enabled to toggle selected MAR bit 8 any time there is an end of block indication or if a carry signal is generated by toggle decodes 320 when MAR 3 or MAR 4 have been selected (OR 350, AND 352).

Finally, OR 348 enables toggle decode 332 if MAR 5 has been selected. When MAR 5 is selected, OR 354 also passes the MAR 5 select signal to enable toggle decode 334. Toggle decode 334 is also enabled when there is an end of block condition detected during mode 4L or mode 4S. Mode 4L is detected by OR 356 when MAR 6 is selected or when there is a mode 4L condition from mode latch 294 (FIG. 4) during MAR 1 or MAR 2 selection (AND 358, OR 360).

AND 355 is also enabled to pass the end of block condition to enable toggle decode 334 if MAR 7 has been selected and mode 18L has been set in the mode register 294 (FIG. 4). The MAR 7 mode 18L (M718L) condition is detected by AND 362 which is shown enabling AND 364 adjacent toggle decode 340. Toggle decodes 336, 338 and 340 are all enabled during the MAR 7 mode 18L condition. Toggle decode 340 is enabled during this time by an end of block condition being passed by AND 364. Similarly, toggle decode 338 is enabled by AND 364. Toggle decode 336 is enabled by end of block condition being passed by AND 366 and OR 368.

Toggle decode 336 is also enabled during mode 2K. In mode 2K, (MARS 3 and 4), the carry signal from toggle decodes 320 generates the enable signal which is passed by OR 368 to toggle decode 336.

Also, when MAR 7 and mode 18L are selected, master bits 8 through 12 are preset so that as five bits, they represent the count of two. The count of two is the starting point for mode 18L. This reset condition is detected by ANDS 370 and 372. AND 370 is enabled by the M718L signal, by the end of block signal and by a count of 19 in input bits 8 through 12. The input bit count of 19 is detected by AND 372.

A particular increment logic has been shown in FIG. 6 to rapidly implement without ripple carries, the sequences of memory accessing mapped in FIG. 7A and 7B. However, it will be appreciated by one skilled in the art that many alternative counting techniques and incrementing logic techniques may be utilized to perform the sequences.

While we have illustrated and described the preferred embodiment of our invention, it is understood that we do not limit ourselves to the precise construction herein disclosed and the right is reserved to all changes and modifications coming within the scope of the invention as defined in the appended claims.

What is claimed is:

1. A peripheral processing controller in a system having a plurality of peripheral devices processing data directly with a memory and independently of a central processor, said controller providing access from each peripheral device to the memory and comprising:
 a plurality of memory address registers, each register associated with one of the peripheral devices and assigned an access mode, defining a memory space addressing sequence, and a memory space allocation;
 said memory address registers being initialized to a starting address;
 means for accessing the memory with the starting address from a selected one of said memory address registers, said accessing means responsive to said access mode for advancing the access address through memory space in the address sequence controlled by said access mode as the peripheral device associated with the selected register processes data with the memory;
 detection means responsive to the memory space allocation assigned to the selected memory address register for detecting when a block of memory space allocated to the peripheral device associated with the selected register has been consumed by the peripheral device.

2. The apparatus of claim 1 and in addition:
 at least one of said registers having more than one assigned access mode;
 means initialized by the central processor for selecting the access mode assigned to registers having more than one mode.

3. The apparatus of claim 2 and in addition:
 said accessing means is responsive to the selected access mode to jump the memory address to the beginning of the next successive block in a succession of blocks of memory space, after the currently accessed block of space is consumed, and to return the memory address to the first block in the succession of blocks of space after all blocks have been accessed.

4. The apparatus of claim 2 and in addition:
 said accessing means is responsive to the selected access mode to scroll memory addressing through multiple blocks of memory space.

5. The apparatus of claim 2 and in addition:
 said accessing means is responsive to the selected access mode to sequence the memory address alternately between two blocks of memory space after each block of space is consumed.

6. The apparatus of claim 2 wherein said selecting means comprises:
 mode storage means for storing an access mode, said mode storage means being initialized by the central processor to a selected access mode;
 means responsive to the selection of a memory address register for enabling said mode storage means to pass the selected access mode to said accessing means when the memory address register assigned the selected access mode is selected.

7. The apparatus of claim 6 and in addition:
 said accessing means is responsive to the selected access mode to sequence the memory address alternately between two blocks of memory space after each block of space is consumed.

8. The apparatus of claim 6 and in addition:
 said accessing means is responsive to the selected access mode to jump the memory address to the beginning of the next successive block in a succession of blocks of memory space after the currently accessed block of space is consumed, and to return the memory address to the first block in the succession of blocks of space after all blocks have been accessed.

9. The apparatus of claim 6 and in addition:
 said accessing means is responsive to the selected access mode to scroll memory addressing through multiple blocks of memory space.

* * * * *